US012761060B2

(12) United States Patent
Malinovskiy et al.

(10) Patent No.: US 12,761,060 B2
(45) Date of Patent: Oct. 13, 2026

(54) DETECTING A BOUNDARY LAYER USING A MACHINE LEARNING ALGORITHM

(71) Applicant: Endress+Hauser SE+Co. KG, Maulburg (DE)

(72) Inventors: Alexey Malinovskiy, Maulburg (DE); Ralf Reimelt, Freiburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 387 days.

(21) Appl. No.: 18/569,274

(22) PCT Filed: May 19, 2022

(86) PCT No.: PCT/EP2022/063604
§ 371 (c)(1),
(2) Date: Dec. 12, 2023

(87) PCT Pub. No.: WO2022/263100
PCT Pub. Date: Dec. 22, 2022

(65) Prior Publication Data

US 2024/0353251 A1 Oct. 24, 2024

(30) Foreign Application Priority Data

Jun. 18, 2021 (DE) ..................... 10 2021 115 871.0

(51) Int. Cl.
*G01F 23/284* (2006.01)
*G01F 23/80* (2022.01)
(Continued)

(52) U.S. Cl.
CPC ............ *G01F 23/284* (2013.01); *G01F 23/80* (2022.01); *G01S 7/417* (2013.01); *G06N 20/00* (2019.01)

(58) Field of Classification Search
None
See application file for complete search history.

(56) References Cited

U.S. PATENT DOCUMENTS 5,789,676 A * 8/1998 Fay ...................... G01N 29/032 73/290 V
2012/0299768 A1* 11/2012 Griessbaum .......... G01F 23/296 367/128
(Continued)

FOREIGN PATENT DOCUMENTS

CN 103697965 A1 4/2014
CN 103968916 A1 8/2014
(Continued)

OTHER PUBLICATIONS

Borg, et al., Machine-learning classification of environmental conditions inside a tank by analyzing radar curves in industrial level measurements, Flow Measurement and Instrumentation 79 (2021) 101940, 9 pp.
(Continued)

*Primary Examiner* — Matthew G Marini
(74) *Attorney, Agent, or Firm* — Mark A. Logan; Endress+Hauser (USA) Holding, Inc.

(57) ABSTRACT

A measuring system for detecting a boundary layer on a product in a container includes a radar-based measuring device with an antenna or a measuring sensor for transmitting high-frequency signals toward the product and, after reflection at the product surface, for receiving as received signals; a signal generation unit that generates the high-frequency signal; and a receiving unit that to record the received signal. The measuring system further includes an evaluation unit in which a machine learning algorithm is formed to detect the boundary layer on the basis of the received signal. The implementation of a machine learning algorithm according to the invention avoids the problem that the boundary layer or the additive product layer in the received signal often does not generate a clearly assignable
(Continued)

signal maximum, which known distance measurement methods according to the prior art require for its detection.

8 Claims, 1 Drawing Sheet

(51) Int. Cl.
*G01S 7/41* (2006.01)
*G06N 20/00* (2019.01)

(56) References Cited

U.S. PATENT DOCUMENTS

| | | | | |
|---|---|---|---|---|
| 2014/0104098 | A1 | 4/2014 | Linden et al. | |
| 2020/0193620 | A1 * | 6/2020 | Armstrong | G06V 10/82 |

FOREIGN PATENT DOCUMENTS

| | | | |
|---|---|---|---|
| CN | 112236672 | A1 | 1/2021 |
| DE | 4223346 | A1 | 1/1994 |
| DE | 102007060579 | A1 | 7/2009 |
| DE | 102009055262 | A1 | 6/2011 |

OTHER PUBLICATIONS

Borg, et al., Neural networks as a diagnosing tool for industrial level measurement through non-contacting radar type and support to the decision for its better application, ScienceDirect, IFAC-PapersOnLine 49-30 (2016), www.sciencedirect.com, 349-354, 6 pp.

* cited by examiner

DETECTING A BOUNDARY LAYER USING A MACHINE LEARNING ALGORITHM

CROSS-REFERENCE TO RELATED APPLICATIONS

The present application is related to and claims the priority benefit of DPMA Patent Application No. 10 2021 115 871.0, filed on Jun. 18, 2021, and International Patent Application No. PCT/EP2022/063604, filed May 19, 2022, the entire contents of which are incorporated herein by reference.

TECHNICAL FIELD

The invention relates to radar-based detection of a boundary layer on the basis of machine learning algorithms.

BACKGROUND

In automation technology, in particular for process automation, field devices by means of which various process variables can be detected are often used. The process variable to be specified can be, for example, a fill level, a flow, a pressure, the temperature, the pH value, the redox potential, a conductivity or the dielectric value of a medium in a process plant. In order to capture the corresponding measured values, the field devices each comprise suitable sensors or are based upon suitable measuring principles. A variety of various types of field devices is manufactured and marketed by the Endress+Hauser group of companies.

For measuring the fill level of products in containers, radar-based measuring methods have become established, since they are robust and low-maintenance. A key advantage of radar-based measuring methods is their ability to measure the fill level more or less continuously and without contact. In the context of this patent application, the terms "radar" and "high frequency" refer to electromagnetic waves with frequencies between 0.03 GHz and 300 GHz. Typical frequency bands at which fill-level measurement is performed are at 2 GHZ, 26 GHZ, 79 GHZ, or 120 GHz. The two common measurement principles here are the pulse transit time principle (also known by the term, "pulse radar") and the FMCW ("frequency-modulated continuous wave") principle. On the basis of the pulse transit time method and on the basis of the FMCW method, fill-level measuring devices can be implemented with comparatively low circuitry complexity and a high fill-level resolution in the sub-millimeter range. Radar-based measurement principles are described in greater detail in, for example, "*Radar Level Detection, Peter Devine,* 2000."

In addition to freely-radiating radar measurement, in which the high-frequency signals are emitted or received via an antenna, the variant of guided radar also exists. In this case, instead of the antenna, an electrically conductive measuring sensor (for example, a coaxial waveguide or a metal rod) is used, which is lowered into the container in order to guide the high-frequency signals. Similarly to freely-radiating radar, the high-frequency signal in the measuring sensor is reflected at the fill level of the product surface and guided back along the measuring sensor towards the fill-level measuring device. This variant of radar-based, fill-level measurement is also known by the term "TDR" (time-domain reflectometry). This variant is advantageous in that, due to the guided signal radiation, less power is required for operating the fill-level measuring device. A TDR-based fill-level measuring device is described, for example, in US patent specification 10,07,743 B2.

Independently of the measuring principle (pulse transit time, FMCW, TDR), the fill-level value is specified by determining from the reflected received signal the signal maximum resulting from the product surface and its corresponding distance value. In general, the various radar-based measurement principles are described, for example, in "*Radar Level Detection, Peter Devine,* 2000."

Depending on the type of product whose level is to be specified, the product can be pervaded with impurities, additives or foreign substances, which can form an additive product layer above or below the product, such as a foam, a sediment or an oily or aqueous phase. In this case, a more or less pronounced boundary layer, often also understood as a "separating layer," is also formed between the actual product and the additive product layer. Accordingly, the fill-level measurement can be disturbed or falsified by possible additional product layers, since the corresponding signal maximum of the product surface cannot be identified with certainty. For this reason, it is of interest to be able to reliably detect not only the fill level of the product, but also the presence or even the thickness of an additive product layer. A TDR-based fill-level measuring device that determines a possible additive product layer by comparing the amplitude with a theoretical target value is described in European patent application 2 722 655 A1. However, even in this case, detection by means of identification of the corresponding signal maximum is at least uncertain, since the additive product layer or its surface may reflect the corresponding signal only very weakly.

SUMMARY

For this reason, the invention is based on the object of being able to reliably determine a possible boundary layer.

The invention achieves this object by means of a corresponding measuring system for detecting a boundary layer on a product contained in a container. For this purpose, the measuring system comprises the following components:

- a radar-based measuring device, having
  - a transmission unit, such as an antenna or a measuring sensor, by means of which high-frequency signals can be transmitted in the direction of the product and, after reflection at the product surface, can be received as received signals,
  - a signal generation unit that is designed to generate the radio frequency signal to be transmitted, and having
  - a receiving unit that is designed to record the received signal, and
- an evaluation unit in which, according to the invention, a machine learning algorithm is formed in order to detect the boundary layer on the basis of the received signal.

Within the scope of the invention, the term "unit" in principle refers to any electronic circuit that is designed in a manner suitable for the intended purpose. Depending on the requirement, it can therefore be an analog circuit for generating or processing corresponding analog signals. However, it can also be a digital circuit such as a microcontroller or a storage medium operating in conjunction with a program. The program is designed to carry out the corresponding method steps or to apply the necessary computing operations for the respective unit. In this context, various electronic units of the measuring system in the sense of the invention can potentially also access a common physical memory or be operated physically by means of the same digital circuit.

The implementation of a machine learning algorithm according to the invention avoids the problem that the boundary layer or the additive product layer in the received signal often does not generate a clearly assignable signal maximum that traditional distance measuring methods according to the prior art, such as the TDR method, the pulse transit time method or the FMCW method, require for its detection. It is rather the case that received signals recorded under complex measurement conditions, such as multiple reflections, can be interpreted much better by means of machine learning algorithms.

In addition to the detection of the boundary layer according to the invention, it is also conceivable that the evaluation unit or the receiving unit of the measuring device is also designed to additionally determine the fill level of the product in the container with the aid of the received signal on the basis of traditional distance measuring methods.

In particular, within the scope of the invention, the evaluation unit can be designed to use the received signal to determine by means of the machine learning algorithm a vertical thickness and/or a vertical position of the boundary layer with respect to the height above container bottom, in particular as a function of the height above the container bottom, a mass or volume fraction of the product in the boundary layer, and/or a dielectric value with respect to the height above the bottom of the container.

In this case, the mass or volume fraction of the product in the boundary layer can be detected, for example, by the evaluation unit determining along the measuring sensor a distribution of the attenuation coefficient, of the conductivity and/or of the dielectric constant in the container by means of the machine learning algorithm.

Within the scope of the invention, a "machine learning algorithm" is defined in principle as any universal mathematical function approximator that maps at least one of its input variables to at least one of its output variables. Internal parameters of the corresponding mapping functions are adjusted during a teaching phase based on known training data. In this case, in particular, supervised learning is implemented as an algorithmic approach. In this connection, the specific form in which the machine learning algorithm is implemented is not firmly prescribed within the scope of the invention. For example, the machine learning algorithm can be implemented in the form of "decision trees," a "support vector machine," "naive Bayes classifiers," or "k-nearest neighbor." However, the boundary layer can be detected particularly effectively if the machine learning algorithm is designed on the basis of a non-symbolic approach, such as an artificial neural network, in particular in the form of a deep learning method. Machine learning algorithms are described in more detail, for example, in "*Introduction to Artificial Intelligence*" (Wolfgang Ertel, 2017).

Furthermore, how or where the evaluation unit is implemented is not essential within the scope of the invention. For example, the evaluation unit can be designed as an integral component of the measuring device, or as a component of a higher-level network, such as a cloud or server, or as a component of a plant-specific process control system.

It is advantageous if the measuring device is designed on the basis of the TDR method, such that the transmission unit is realized as a measuring sensor that extends into the container. Corresponding to this, the signal generation unit generates the high-frequency signal to be transmitted in this case according to the TDR method in a correspondingly pulse-wise manner. An advantage of the TDR method with respect to the idea according to the invention is that the received signal has an overall higher signal amplitude compared to freely-radiating radar, which in principle makes it easier for the machine learning algorithm to identify the boundary layer.

Corresponding to the measuring system according to the invention, the object underlying the invention is further achieved by a corresponding measuring method for detecting a boundary layer of a product in a container by means of the measuring system according to any one of the embodiments described above. In this case, the method comprises the following method steps:

emitting a high-frequency signal via the transmission unit into the container, recording the received signal after reflection of the high-frequency signal there, and such evaluation of the received signal by means of the machine learning algorithm such that the boundary layer is detected.

The machine learning algorithm can be learned in the teaching phase, which is required before the actual measurement operation, for example by means of experimentally obtained and/or simulation-generated received signals, such as by means of "CST Microwave Studio."

BRIEF DESCRIPTION OF THE DRAWINGS

The present disclosure will be explained in more detail with reference to the following figures. In the figures.

DETAILED DESCRIPTION

Figure 1:
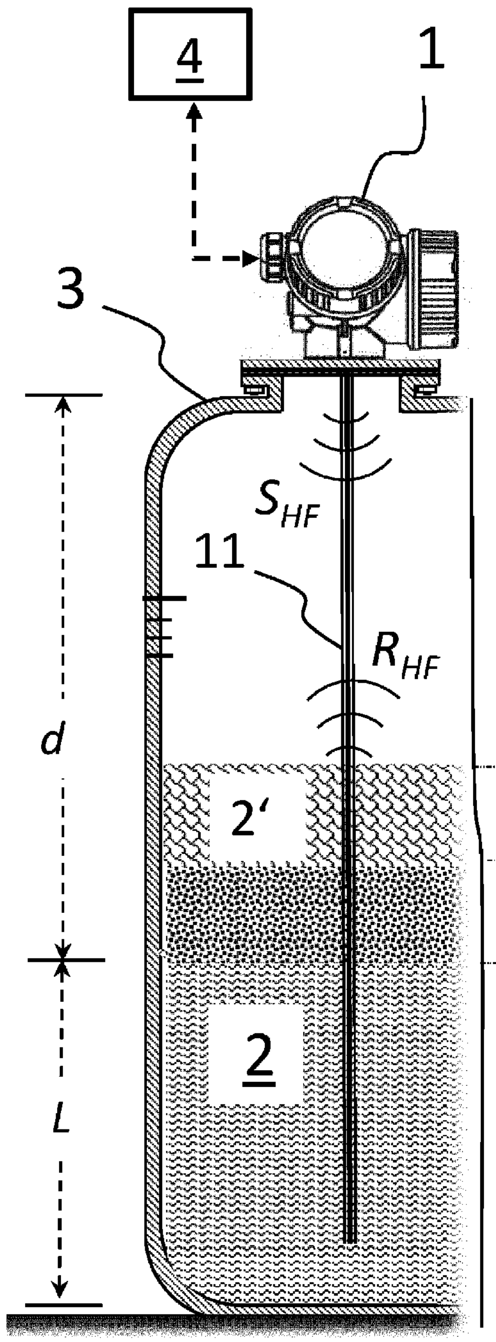
FIG. 1 shows a TDR-based measuring device for detecting a boundary layer in a container according to the present disclosure.

To understand the detection of a boundary layer according to the invention, a TDR-based measuring device 1 is shown in FIG. 1, by means of which the fill level L of a product 2, 2' in a container 3 can be determined.

According to the TDR method, the measuring device 1 comprises a measuring sensor 11 as the transmission unit 11 for high-frequency signals $S_{HF}$, $R_{HF}$ in the direction of the product 2, 2' or after reflection in the container 3. Contrary to the embodiment shown in FIG. 1, in the case of freely-radiating radar, the measuring device 1 comprises at least one antenna as the transmission unit 11. To determine the fill level L, the measuring sensor 11 extends inside the container from the measuring device 1 at the top of the container 3 to more or less the bottom of the container 3. In this case, the installation height h of the measuring device 1 above the container bottom is known and stored in the fill-level measuring device 1 or in an external evaluation unit 4, such as a decentralized server or a central process control system.

Via the measuring sensor 11, the high-frequency signal $S_{HF}$ to be emitted is conducted in pulsed form or with a frequency ramp in the direction of the product 2, 2' according to the TDR method. Due to the jump in the dielectric value DK at the surface of the product 2, 2', the emitted high-frequency signal $S_{HF}$ is then reflected at the level of the product surface in the measuring sensor 11 and received accordingly after a corresponding signal transit time t in the measuring device 1 as the received signal $R_{HF}$. In this case, the signal transit time t of the signal $S_{HF}$, $R_{HF}$ according to $$t = \frac{2d}{c}$$

depends on the distance d $$d = h - L$$

from the container top to the product surface. In this case, c is the propagation speed of the high-frequency signal $S_{HF}$, $R_{HF}$ along the measuring sensor 11, which lies within the range of the speed of light c.

To generate the high-frequency signal $S_{HF}$, the fill-level measuring device 1 comprises a correspondingly designed signal generation unit—in the case of the TDR method, for example, this can be based on a capacitor that is correspondingly discharged to generate the pulse lasting approximately 100 ps to 1 ns. In the case of free-radiating radar according to the pulse transit time method or FMCW method, the signal generation unit can comprise, for example, a frequency-controlled high-frequency oscillating circuit or an oscillating crystal. In order for the signal generation unit to generate the high-frequency signal $S_{HF}$ according to the respective method at the required clock rate in pulse or ramp form, the capacitor or the crystal oscillator is driven in a correspondingly clocked or modulated manner.

Between the signal generation unit of the measuring device 1 and the measuring sensor 11, a transceiver switch is interposed in order to feed the received signal $R_{HF}$ after reflection in the container 3 to a receiving unit, in which the received signal $R_{HF}$ is digitized or recorded. In this case, the design of the transceiver switch is, in principle, not firmly specified. In the case of the TDR method, as is the case in the embodiment shown in FIG. 1, the transceiver switch can be designed, for example, as a purely electrical node. Particularly in the case of freely-radiating radar, the transceiver switch can be implemented as, for example, a duplexer.

To determine the fill level L, the received signal $R_{HF}$ can be recorded in the receiving unit, for example, by undersampling the received signal $R_{HF}$ according to the pulse transit time principle such that the received signal $R_{HF}$ is stretched in time by a defined factor. In this case, the time prolongation factor depends upon the sampling rate. For this purpose, the corresponding sampling rate must be selected to achieve sufficient time prolongation, such that it differs from the clock rate of the emitted signal pulses $S_{HF}$ only in the per mille range. The time prolongation simplifies, from a circuitry perspective, the determination of the fill level L on the basis of the received signal $R_{HF}$. In contrast to the embodiment shown in FIG. 1, in the case of freely-radiating radar the received signal $R_{HF}$ is rectified in addition to the time prolongation, such that the recorded received signal $R_{HF}$ has only one polarity—plus or minus—with respect to a fixed reference potential.

Figure 2:
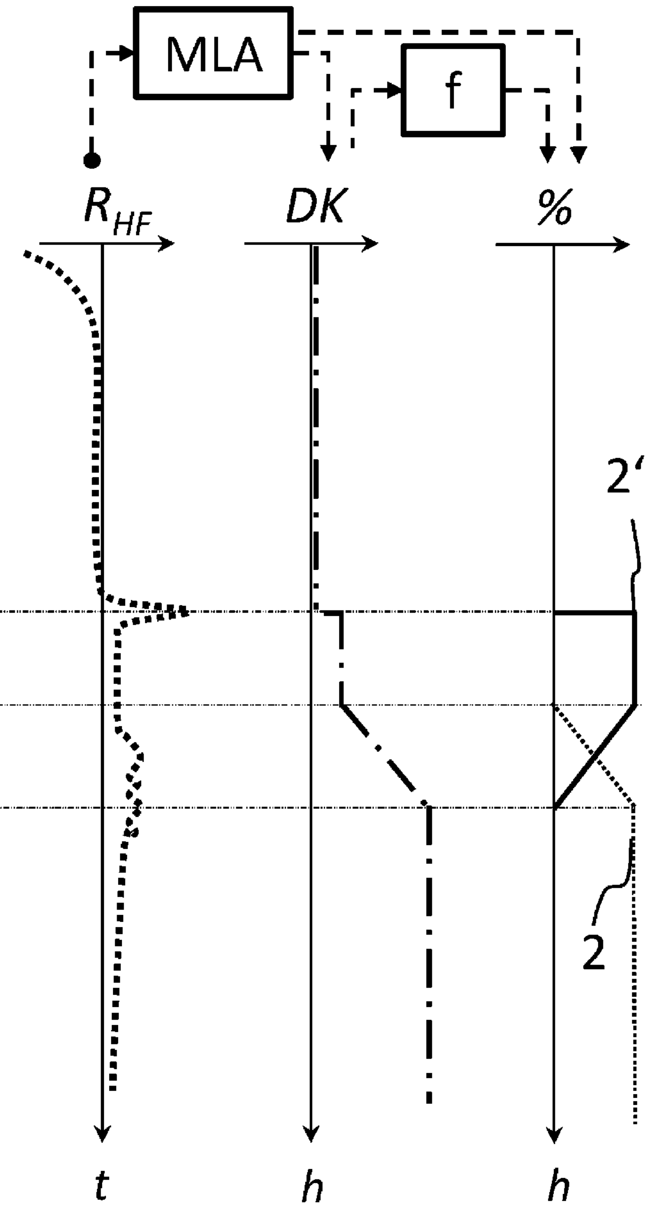
FIG. 2 shows a method for determining the boundary layer according to the present disclosure.

The determination of the fill level L by means of the possibly time-prolonged received signal $R_{HF}$ is illustrated in more detail by the left-hand curve in FIG. 2—the curve there illustrates the time amplitude curve of the possibly time-prolonged received signal $R_{HF}$. In this case, the distance d between the container top and the product surface is proportional to the signal transit time axis t of the curves shown in FIG. 2. In the ideal case, i.e. without any external interference, the received signal $R_{HF}$ comprises at least one signal maximum that is caused at the surface of the product 2, 2'. In this case, the fill level L is specified on the basis of the transit time t corresponding to the signal maximum and the previously mentioned formulas.

As shown in FIG. 1, an additive product layer 2', such as an aqueous phase of an otherwise oil-based product 2, is formed above the product 2. In this case, the additive layer 2' is vertically separated from the product 2 by a boundary layer in which both components, i.e. oil and water, are present as an emulsion in, in each case, a defined mass or volume fraction %.

The exemplary embodiment in FIG. 1 or FIG. 2 illustrates that the signal maximum of the received signal $R_{HF}$ in this case is not caused by the actual product 2, but by the additive product layer 2'. At the level of the boundary layer or below it, the received signal $R_{HF}$ also shows an increased signal amplitude due to reflection in the boundary layer or at the surface of the actual product 2, but in case of doubt, no definite signal maximum can be determined from this. For this reason, regardless of whether the measuring device 1 is based on the pulse transit time principle, the FMCW principle or the TDR principle, it is only possible to determine the cumulative fill level of the product 2 and the additive product layer 2'. In this case, depending on the application or process plant, it is essential to know the fill level L of the pure product 2, as shown in FIG. 1. In this connection, it may also be necessary to know as a parameter the presence or thickness of the additive product layer 2'. A further relevant parameter may be the thickness of the boundary layer or the mass or volume fraction % of the product 2 or additive 2' prevailing there. The mass or volume fraction % should be determined in a manner as spatially resolved as possible, i.e. as a function of the height h above the container bottom. Within the scope of the invention, the term "detecting a boundary layer" thus refers to the determination of one or more of these previously presented parameters.

According to the invention, such parameters related to the boundary layer can be determined by applying a machine learning algorithm MLA to the possibly time-prolonged received signal $R_{HF}$. In this case, which learning algorithm MLA is applied is not specified in principle. However, artificial neural networks, in particular "deep learning," are proving to be particularly effective in this regard. This idea according to the invention avoids the problem that the boundary layer or the additive product layer often does not generate a clearly assignable signal maximum in the received signal, which would be required for its detection according to the prior art.

Since the application of the machine learning algorithm MLA may require a high computing power, it is advantageous if the machine learning algorithm MLA is not implemented in the measuring device 1 itself, but in the external evaluation unit 4, since the measuring device 1 may be subject under certain circumstances to a limited power supply in the process plant. In this case, the measuring device 1 or its receiving unit can transmit the recorded received signal $R_{HF}$ to the evaluation unit 4 via a suitable interface, such as "PROFIBUS," "HART," "Wireless HART," "4-20 mA," "Bluetooth" or "Ethernet." The evaluation unit 4 together with the measuring device 1 thus forms a corresponding measuring system for detecting a boundary layer in the container 3 according to the invention. Provided that sufficient computing power is also available in the measuring device 1, the machine learning algorithm MLA for detecting a boundary layer can also be implemented in the measuring device 4 itself.

The application of machine learning algorithms MLA requires teaching the measuring system according to the invention under known conditions. For this reason, prior to regular measuring operation, the measuring device 1 is to be exposed to various teaching situations with known parameters, such as the fill level L of the product 2,
the thickness of the boundary layer,
the thickness of the additive product layer,
a known product type or its dielectric value DK,
the dielectric value DK of the additive product layer.

The underlying received signals $R_{HF}$ can be obtained not only experimentally but also by means of simulation, such as by "CST Microwave Studio." This avoids a time-consuming teaching phase in the process plant.

FIG. 2 illustrates an advantageous way in which the measuring system according to the invention can detect the boundary layer or the aforementioned parameters in regular measuring operation based on the received signal $R_{HF}$ on the basis of the machine learning algorithm MLA after completion of the teaching phase—by means of the machine learning algorithm MLA, the dielectric value DK in the container 3 is determined from the received signal $R_{HF}$, which is dependent on the signal transit time t, as a function of the signal transit time t or as a function of the height h, as shown by the middle curve in FIG. 2. Based on this, the individual parameters can be inferred in the evaluation unit 4 by means of a correspondingly programmed logic or evaluation function f:

The constant dielectric value DK in the upper transit time range must be assigned to the atmosphere above the product or above the additive product layer 2'.
If the dielectric value DK changes over a defined range of the signal transit time t, the boundary layer must be present within this range.
The constant dielectric value DK below the region belonging to the boundary layer must be assigned to the product 2, wherein the dielectric value DK allows conclusions to be drawn about the product type (a dielectric value in the range of 80 can be assigned to a 100% water-containing medium; see also the right-hand curve in FIG. 2).
The constant dielectric value DK above the signal transit time range, which belongs to the boundary layer, must be assigned to the additive product layer 2', wherein the corresponding dielectric value DK in turn indicates the type of additive product layer 2' (a dielectric value in the range of two can, for example, be assigned to a 100% oil-containing medium),
Based on the position of the boundary layer, the fill level L can be determined.
The thickness of the additive product layer 2' can be determined based on the expansion of the signal transit time region assigned to the additive product layer 2',
Depending on how the dielectric value DK changes within the boundary layer, the mass/volume fraction % of the product 2 or of the additive product 2' within the boundary layer also changes, as can be seen from the middle and right-hand curves in FIG. 2—since the dielectric value DK increases continuously with increasing signal transit time t or with decreasing height h, the fraction % of the product 2 must increase continuously (from 0% to 100%) as the height h decreases. Conversely, the fraction % of the additive product 2' must also decrease continuously (from 100% to 0%) with increasing distance d.

Instead of determining the respective fraction % indirectly via the dielectric value, it is also conceivable within the scope of the invention to determine the fraction % directly from the received signal $R_{HF}$ by means of the machine learning algorithm MLA, as is also illustrated in FIG. 2.

With the exemplary embodiment shown in FIG. 1 and FIG. 2, only an additive product layer 2' is formed in addition to the actual product 2. It goes without saying that the idea according to the invention can also be applied even when a plurality of additive product layers 2' are present.

The invention claimed is:

1. A measuring system for detecting a boundary layer of a product in a container, comprising:
a radar-based measuring device, including:
a transmission unit designed as a measuring probe extending into the container via which high-frequency signals can be transmitted in a direction of the product and, after reflection at a product surface, can be received as received signals;
a signal generation unit that is designed to generate according to a time-domain reflectometry (TDR) method the high-frequency signals to be transmitted; and
a receiving unit that is designed to record the received signals; and
an evaluation unit in which a machine learning algorithm is formed in order to detect the boundary layer on the basis of the received signals,
wherein, in a learning phase, the machine learning algorithm is exposed to teaching situations with known measuring system parameters, including: a fill level of the product, a thickness of the boundary layer, a thickness of an additive product layer, a dielectric value of the product, and a dielectric value of the additive product layer,
wherein the machine learning algorithm is configured to determine along the measuring probe a distribution of an attenuation coefficient and/or of a dielectric constant in the container, and
wherein the machine learning algorithm is further configured to determine from the distribution of the attenuation coefficient and/or of the dielectric constant in the container a mass or a volume fraction of the boundary layer.

2. The measuring system according to claim 1, wherein the evaluation unit is designed, via the machine learning algorithm, to determine:
a thickness and/or a vertical position of the boundary layer with respect to a height above a bottom of the container; and/or
as a function of the height above the bottom of the container, the mass or the volume fraction of the product in the boundary layer; and/or
a dielectric value with respect to the height above the bottom of the container.

3. The measuring system according to claim 1, wherein the machine learning algorithm is designed as an artificial neural network.

4. The measuring system according to claim 1, wherein the evaluation unit is designed to determine the fill level of the product in the container on the basis of the received signal.

5. The measuring system according to claim 1, wherein the evaluation unit is designed as an integral component of the measuring device.

6. The measuring system according to claim 1, wherein the evaluation unit is designed as a component of a higher-level network.

7. A method for detecting a boundary layer of a product in a container, comprising:

providing a measuring system for detecting the boundary layer of the product in the container, including:

a radar-based measuring device, including:

a transmission unit designed as a measuring probe extending into the container via which high-frequency signals can be transmitted in a direction of the product and, after reflection at the product surface, can be received as received signals;

a signal generation unit that is designed to generate according to a time-domain reflectometry (TDR) method the high-frequency signals to be transmitted; and a receiving unit that is designed to record the received signals; and an evaluation unit in which a machine learning algorithm is formed in order to detect the boundary layer on the basis of the received signals;

wherein, in a learning phase, the machine learning algorithm is exposed to teaching situations with known measuring system parameters, including: a fill level of the product, a thickness of the boundary layer, a thickness of an additive product layer, a dielectric value of the product, and a dielectric value of the additive product layer, emitting the high-frequency signals according to the TDR method via the transmission unit into the container;

recording the received signals after reflection of the high-frequency signals; and evaluating the received signals via the machine learning algorithm such that the boundary layer is detected, wherein the evaluating includes:

determining along the measuring probe a distribution of an attenuation coefficient and/or of a dielectric constant in the container; and determining from the distribution of the attenuation coefficient and/or of the dielectric constant in the container a mass or a volume fraction of the boundary layer.

8. The method according to claim 7, wherein the machine learning algorithm is taught by means of experimentally obtained and/or simulation-generated received signals.

* * * * *